Figure 1:
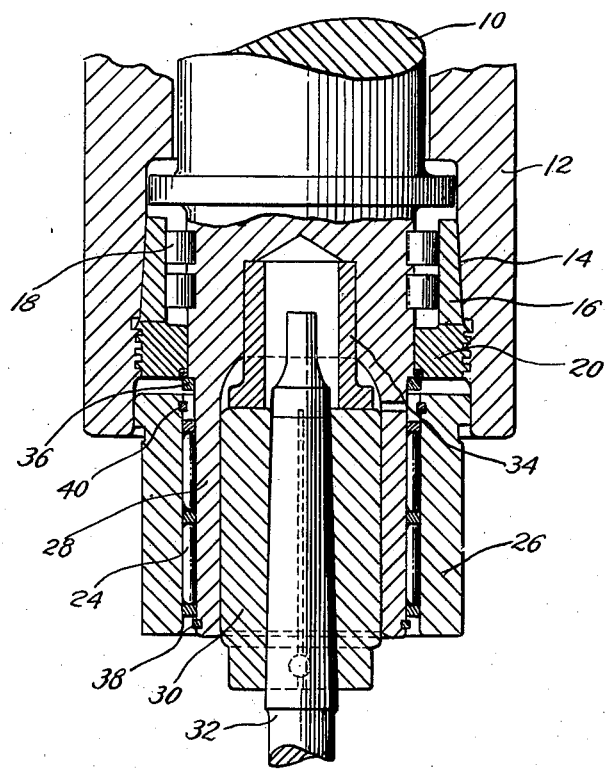

May 4, 1948.   P. M. MUELLER   2,440,908
TOOL RETAINER
Filed Dec. 23, 1946

INVENTOR
Paul M. Mueller
BY
Joseph G. Schofield
ATTORNEY

Patented May 4, 1948

2,440,908

UNITED STATES PATENT OFFICE 2,440,908

TOOL RETAINER

Paul M. Mueller, West Hartford, Conn., assignor to Niles-Bement-Pond Company, West Hartford, Conn., a corporation of New Jersey Application December 23, 1946, Serial No. 717,935

5 Claims. (Cl. 279—46)

This invention relates to tool retainers and particularly to a tool retainer, the principal member of which forms an integral part of a machine tool spindle.

A primary object of the invention is to provide a tool rotating spindle having a central axial recess of uniform diameter at one end, the surrounding walls of which are integral with the spindle and sufficiently thin to be uniformly compressible upon and firmly grip the shank of a tool or end of a work piece inserted within the recess.

A feature of advantage of the present form of tool retainer is that the ability of the retainer to maintain the axis of the tool in alinement with the axis of the rotating spindle is independent of inserted members and dependent only upon the alinement of the axis of the tool receiving recess or socket with the axis of rotation of the spindle.

And finally it is an object to provide a tool retainer that may be manually tightened and released without the aid of a wrench, the amount of adjustment by compression of the wall being limited by positive stops to prevent permanent distortion of these walls.

With the above and other objects in view, the invention consists in the features of construction and operation set forth in the following specification and illustrated in the accompanying drawing.

In the accompanying drawing annexed hereto and forming a part of this specification, the invention is shown embodied in the vertical spindle of a machine tool having a rotating tool or cutter such as a jig borer or vertical drill, but it will be understood that the invention can be otherwise embodied and that the drawing is not to be construed as defining or limiting the scope of the invention, the claims appended to this specification being relied upon for that purpose.

Figure 2:
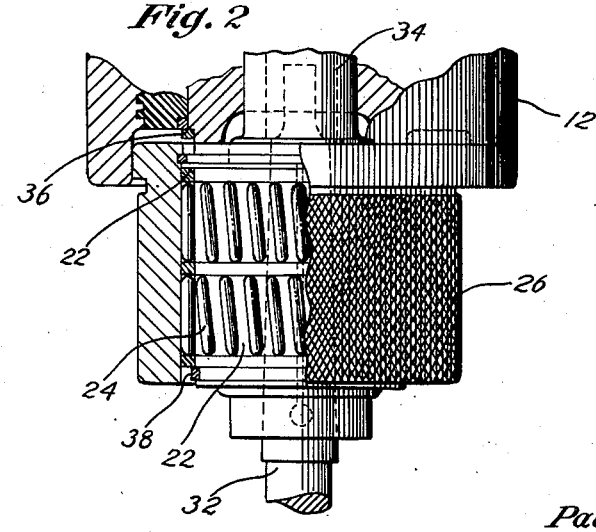

In the drawing:

Figure 1 is a central longitudinal sectional view showing the retainer, a tool in position within the spindle recess, and Fig. 2 is an outside view partially broken away showing the rollers for tightening and releasing the retainer.

In the above-mentioned drawing there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: First, a spindle supported for rotation within a suitable quill or other member and having a recess of uniform diameter at its lower end, the walls of the spindle surrounding the recess being sufficiently thin to be slightly compressible; second, a roller bearing adjacent the lower end of the spindle for supporting the spindle for rotation within its supporting member, this roller bearing member being axially adjustable to take up lost motion; third, a series of short cylindrical rollers surrounding the wall of the spindle adjacent the tool receiving socket; fourth, a rotatable member engaging the outer surfaces of the rollers and being rotatable manually relative to the spindle; fifth, means to space the rollers and retain them at a slight helix angle to the axis of the spindle; and sixth, means to limit the movement of the rotating member relative to the spindle.

Referring more in detail to the figures of the drawing, there is shown the lower end only of a tool rotating spindle 10 and a quill 12 within which it is supported. It will be understood that any means (not shown) may be employed to rotate the spindle at different speeds and that the quill, or other supporting member, may be axially reciprocated.

To rotatably support the spindle 10 within its quill 12 at the end adjacent the tool retainer, an antifriction bearing is provided. The lower end of the quill is bored, as shown at 14, to form a relatively large opening having a slight taper. Engaging this taper or conical surface 14 of the quill 12 is a thin ring 16 having a cylindrical central opening. This ring 16 on its inner surface forms the outer bearing surface for a series of rollers 18, which, as shown, may engage within suitable annular grooves formed in the spindle 10. To position the ring 14 forming the outer bearing for the rollers 18 a threaded member 20 engaging an internally threaded portion of the quill bears against its lower end so that rotation of this threaded ring 20 forces the tapered ring 14 vertically and slightly compresses it to engage firmly but rotatably against the outer surfaces of the roller 18.

Positioned about the lower end of the spindle 10 which has a large cylindrical recess is a roller retaining member 22 having oblique openings therein within which are positioned cylindrical rollers 24. This retaining member 22 fits freely within the space between the outer surface of the spindle 10 and the sleeve 26. These rollers 24, as shown clearly in Fig. 2, are disposed at a slight helix angle to the longitudinal axis of the spindle 10 and are held in spaced apart position by their retainer 22. Engaging the outer surfaces of the rollers 24 is a knurled manually operated sleeve 26, rotation of which relative to the spindle 10 will not only cause rotation of the rollers 24 but will also, due to their obliquity, slightly advance them axially in one or the other direction of the spindle. The outer surface of the spindle 10 engaged by the rollers 24 is slightly tapered so that there is a slightly narrowing annular opening between the outer surface of the spindle 10 and the inner surface of the sleeve 26 within which the rollers 24 are disposed. It will be seen, therefore, that by rotating the sleeve 26 relative to the spindle 10 and the resultant slight axial movement of the rollers 24 along the surface of the spindle that the wall 28 of the spindle 10 will be slightly compressed, this compression being sufficient to firmly grip a tool shank or intermediate member 30 engaging a tool shank 32 within the recess.

In order to axially position the tool shank or other member inserted within the recess properly, an adapter member 34 may be inserted within a smaller recess above the tool receiving recess of the spindle, the end wall of which forms an abutment against which the tool shank or other member may be positioned in mounting a tool within the retainer. Also a ring 36 may be positioned between the annular nut 20 and the upper end of the sleeve 26 so that movement axially of the sleeve 26 by rotation of the rollers 24 will be positively stopped in a direction that would unduly distort the wall 28 of the spindle. In this manner the compressive effect upon the wall of the spindle by axial movement of the rollers is limited to an amount within the elastic limit. Other rings 38 and 40 may be housed within recesses at the lower and upper portions of the spindle adjacent the recess to prevent the rollers 24 and their retainer 22 from dropping from the spindle and the sleeve 26 from separating from the rollers and retainer.

I claim:

1. A tool rotating spindle recessed at one end to form a tool receiving socket having a thin annular wall, a sleeve surrounding said recessed spindle end, rollers interposed between said sleeve and annular wall and disposed at a slight helix angle to the axis of said spindle, the roller engaging walls of said spindle and sleeve forming an axially narrowing annulus for said rollers, whereby rotation of said sleeve relative to said spindle in one direction will advance said rollers along said annular wall and compress said wall.

2. A tool rotating spindle recessed at one end to form a tool receiving socket having a thin annular wall, a sleeve surrounding said spindle end, rollers interposed between said sleeve and annular wall and disposed at a slight helix angle to the axis of said spindle, means retaining said rollers in spaced relation to each other and at said helix angle, the roller engaging walls of said spindle or sleeve being disposed to form a narrowing annulus for said rollers, whereby rotation of said sleeve relative to said spindle in one direction will advance said rollers along said annulus and compress said thin annular wall.

3. A tool rotating spindle recessed at one end to form a tool receiving socket having a thin annular wall, a sleeve supported for rotation on said spindle and surrounding said spindle end, rollers interposed between said sleeve and annular wall and disposed at a slight helix angle to the axis of said spindle, means retaining said rollers in spaced relation to each other and at said helix angle, the outside surface of said spindle being slightly tapered to form a narrowing annulus for said rollers, whereby rotation of said sleeve relative to said spindle will rotate and advance said rollers along said annulus and compress said thin annular wall.

4. A tool rotating rotatable spindle having a thin annular wall at one end surrounding a tool receiving socket, a rotatably supported sleeve surrounding said socket, rollers interposed between said sleeve and annular wall and disposed at a slight helix angle to the axis of said spindle, means retaining said rollers in spaced relation to each other, the outside wall of said spindle being tapered to form a narrowing annulus for said rollers, whereby rotation of said sleeve relative to said spindle will advance said rollers along said annulus and compress said annular wall, and means to limit the amount of movement of said sleeve.

5. A tool retainer for rotatable spindle having a tool receiving socket at one end and having a thin annular wall at said end, a sleeve supported for rotation on said spindle and surrounding said spindle end, rollers interposed between said sleeve and annular wall disposed at a slight helix angle to the axis of said spindle, means retaining said rollers in spaced relation to each other and at said helix angle, the roller engaging wall of said spindle or sleeve being slightly tapered to form a narrowing annulus for said rollers, whereby rotation of said sleeve relative to said spindle will advance said rollers along said annular wall and compress said wall, and stops on said spindle to limit movement of said sleeve in each direction.

PAUL M. MUELLER.